(12) United States Patent
Sugimoto

(10) Patent No.: US 10,367,412 B2
(45) Date of Patent: Jul. 30, 2019

(54) POWER FACTOR CORRECTION CIRCUIT AND SWITCHING POWER SOURCE DEVICE USING THE SAME

(71) Applicant: FUJI ELECTRIC CO., LTD., Kawasaki (JP)

(72) Inventor: Masatoshi Sugimoto, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/045,314

(22) Filed: Jul. 25, 2018

(65) Prior Publication Data

US 2019/0081553 A1    Mar. 14, 2019

(30) Foreign Application Priority Data

Sep. 13, 2017    (JP) .................................. 2017-175504

(51) Int. Cl.
| | |
|---|---|
| *H02M 1/42* | (2007.01) |
| *H02M 7/217* | (2006.01) |
| *H02M 1/00* | (2006.01) |
| *H02M 3/155* | (2006.01) |

(52) U.S. Cl.
CPC ......... *H02M 1/4225* (2013.01); *H02M 7/217* (2013.01); *H02M 1/4241* (2013.01); *H02M 3/155* (2013.01); *H02M 2001/007* (2013.01); *H02M 2001/0009* (2013.01)

(58) Field of Classification Search
CPC ...... H02M 1/4225; H02M 1/42; H02M 3/155; Y02B 70/126; H02N 7/12
USPC .... 363/44, 71, 78, 84, 89, 59, 60, 127, 131; 323/207, 222, 283, 285
See application file for complete search history.

(56) References Cited

U.S. PATENT DOCUMENTS

| | | | | |
|---|---|---|---|---|
| 6,011,707 A | * | 1/2000 | Mine ................... | H02M 1/4225 363/60 |
| 6,215,287 B1 | * | 4/2001 | Matsushiro ......... | H02M 1/4225 323/222 |
| 7,821,237 B2 | * | 10/2010 | Melanson ........... | H02M 1/4225 323/222 |
| 8,716,988 B2 | | 5/2014 | Yabuzaki et al. | |

(Continued)

FOREIGN PATENT DOCUMENTS

| | | |
|---|---|---|
| JP | 2002-84743 | 3/2002 |
| JP | 2011-103725 | 5/2011 |
| JP | 2011-244660 | 12/2011 |

*Primary Examiner* — Rajnikant B Patel

(57) ABSTRACT

To provide a power factor correction circuit capable of maintaining loop gain properly while maintaining current sensing accuracy even when different AC input voltages are input and a switching power source device using the power factor correction circuit. A power factor correction circuit includes: a power factor correction control circuit including an input voltage detection terminal to which voltage corresponding to input voltage to a boost chopper is input, a current sensing terminal to which voltage corresponding to inductor current in the boost chopper is input, an output voltage detection terminal to which voltage corresponding to output voltage from the boost chopper is input, and an output terminal outputting a drive signal for a switching element; and a voltage adjustment circuit configured to detect the input voltage and adjust voltage at the current sensing terminal and voltage at the input voltage detection terminal according to the detected input voltage.

17 Claims, 6 Drawing Sheets

(56) References Cited

U.S. PATENT DOCUMENTS

| | | | |
|---|---|---|---|
| 9,455,623 B2 * | 9/2016 | Fan ........................ | H02M 1/42 |
| 9,502,961 B2 * | 11/2016 | Castelli ............... | H02M 1/4208 |
| 9,859,788 B2 * | 1/2018 | Maruyama .......... | H02M 1/4225 |
| 2005/0068796 A1 * | 3/2005 | Morita ................ | H02M 1/4225 |
| | | | 363/120 |

* cited by examiner

FIG. 4A  $S_{DRV}$
FIG. 4B  Q1 Vds
FIG. 4C  IL1
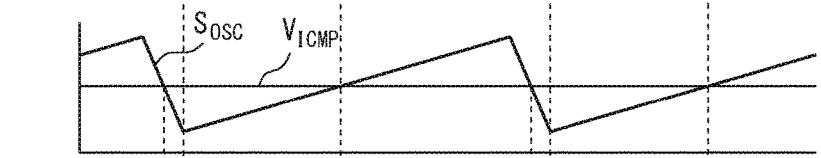
FIG. 4D  $S_{OSC}$  $V_{ICMP}$
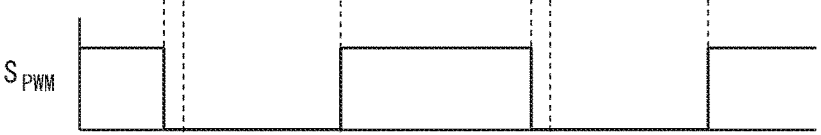
FIG. 4E  $S_{PWM}$
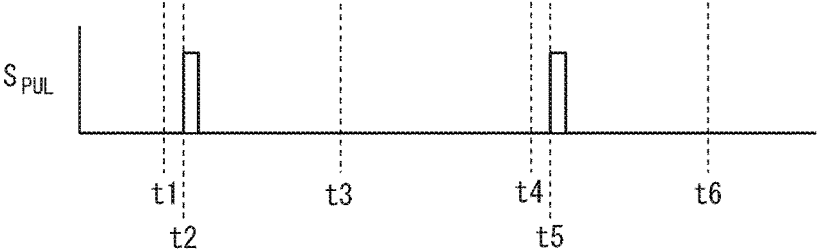
FIG. 4F  $S_{PUL}$
t1  t3  t4  t6
 t2      t5

POWER FACTOR CORRECTION CIRCUIT AND SWITCHING POWER SOURCE DEVICE USING THE SAME

CROSS REFERENCE TO RELATED APPLICATIONS AND INCORPORATION BY REFERENCE

This application claims benefit of priority under 35 USC 119 based on Japanese Patent Application No. 2017-175504 filed on Sep. 13, 2017, the entire contents of which are incorporated by reference herein.

TECHNICAL FIELD

The present invention relates to a power factor correction circuit and a switching power source device using the same.

BACKGROUND ART

As switching power source devices of this type, configurations have been proposed that are capable of accepting AC commercial power sources having different voltages and each of which includes a full-wave rectifier circuit rectifying AC voltage from the AC commercial power sources and a transformer inputting rectified AC voltage to the primary side thereof and outputting DC voltage from the secondary side thereof (see, for example, JP 2011-244660 A). In a conventional technology described in JP 2011-244660 A, it is configured such that voltage on the primary side of a transformer is detected, the gain of an amplifier used for current sensing is altered according to the detected voltage, and a switching element connected to the primary side of the transformer is on/off controlled by means of amplified output from the amplifier.

A switching power source device is generally configured in such a manner that a boost chopper including an inductor and a switching element are interposed between a full-wave rectifier circuit and the primary side of a transformer and the switching element in the boost chopper is on/off controlled by a power factor correction circuit (see, for example, JP 2011-103725 A). In a conventional technology described in JP 2011-103725 A, a power factor correction circuit includes a voltage error amplifier circuit, a multiplier, a current error amplifier circuit, and a PWM comparator. The voltage error amplifier circuit accepts input of feedback voltage representing output voltage from a boost chopper and reference voltage and amplifies and outputs difference voltage between the feedback voltage and the reference voltage. The multiplier multiplies the output from the voltage error amplifier circuit by output voltage from a full-wave rectifier circuit. The current error amplifier circuit accepts input of the output from the multiplier and voltage obtained by inverting-amplifying voltage obtained by sensing inductor current as negative voltage and amplifies and outputs difference voltage between both inputs. The PWM comparator, by comparing a carrier signal from an oscillator circuit with the output from the current error amplifier circuit, generates a pulse-width modulated control signal and supplies a switching element in the boost chopper with the control signal.

SUMMARY OF INVENTION

The conventional technology described in JP 2011-244660 A discloses a switching power source device that alters the gain of the amplifier used for current sensing according to input voltage. An object of the conventional technology is to make uniform operating points for overpower protection and overcurrent protection without depending on input voltage, and JP 2011-244660 A describes nothing about influence of input voltage on a power factor correction characteristic, a problem that the present invention tries to solve.

On the other hand, in the conventional technology described in JP 2011-103725 A, the output voltage from the voltage error amplifier circuit becomes approximately DC voltage in a steady state by means of a phase compensation capacitor connected to the output side. Since the DC voltage and voltage-divided voltage having a sinusoidal shape into which the output voltage from the full-wave rectifier circuit is voltage-divided are input to the multiplier, multiplication output having a sinusoidal shape is obtained from the multiplier. The multiplication output from the multiplier is input to one terminal on the input side of the current error amplifier circuit as a reference for the inductor current. From sensing voltage that is input to the other terminal on the input side of the current error amplifier circuit and that is positive voltage into which the inductor current is converted, a switching ripple in the inductor current is removed by a capacitor connected to the DC output side of the full-wave rectifier circuit. It is possible to improve a power factor by making the current error amplifier circuit amplify a difference between the multiplication output having a sinusoidal shape and the inductor current sensing voltage from which a switching ripple is removed and controlling a switching operation of the switching element according to a result of the amplification so as to cause the inductor current waveform to follow the multiplication output having a sinusoidal shape (to have a synchronous sinusoidal waveform).

In general, sensed voltage value of inductor current that is to be input to a current error amplification circuit is input to an inverting amplifier circuit serving as a current sensing circuit through a current sensing resistor. In JP 2011-103725 A, the resistor R3 in FIG. 2 corresponds to the current sensing resistor.

For this reason, when input voltage from an AC power source takes a wide range of values, such as a range from a low input voltage of AC 85 V to a high input voltage of AC 264 V, the value of the current sensing resistor, which adjusts sensing voltage of the inductor current that is to be input to the current error amplifier circuit, is designed with the input voltage assumed to be AC 85 V, at which the largest current flows. That is, assuming that output power, AC input voltage, input current, and efficiency are denoted by Po, Vac, Iin, and η, respectively, the output power Po is expressed by the following formula:

$$Po = \eta \times Vac \times Iin.$$

Therefore, under the condition that the output power Po is constant, as the AC input voltage Vac decreases, the input current Iin increases. For this reason, when the AC input voltage Vac takes a minimum value, the input current Iin takes a maximum value.

Since, as described above, when the value of the current sensing resistor is designed with the input voltage assumed to be AC 85 V, which is the minimum value of the AC input voltage Vac, the input current Iin becomes small when AC 264 V, which is the maximum value of the AC input voltage, is input, the accuracy of the current sensing circuit is reduced and, caused by the reduction in the accuracy of an input signal to the power factor correction circuit, the power factor deteriorates (is reduced).

In addition, when the power factor correction circuit is operated, the current is controlled to output a sinusoidal wave, which causes a ripple to be generated in the output voltage. That is, while an output capacitor is connected to an output portion of the power factor correction circuit and charging voltage of the output capacitor is output voltage from the power factor correction circuit, since charging current of the output capacitor is a sinusoidal wave, a ripple is generated in the charging voltage of the output capacitor. Thus, in feedback voltage $V_{FB}$ (voltage-divided voltage of the output voltage) input to a voltage error amplifier circuit, ripple voltage $V_{RP}$ as illustrated in FIG. 3B is generated. Since, for this reason, influence of the ripple voltage $V_{RP}$ is exerted on the voltage error amplifier circuit, AC input current is eventually distorted like a waveform illustrated in FIG. 3C and the power factor deteriorates.

Since an input voltage of AC 264 V to a multiplier is approximately three times as high as an input voltage of AC 85 V thereto, the amplitude of output voltage from the voltage error amplifier circuit corresponding to the input voltage of AC 264 V is approximately one third as large as that corresponding to the input voltage of AC 85 V. That is, when average value over every switching period of the sensing voltage $V_{IS}$ of the inductor current, the output voltage from the voltage error amplifier circuit, detection voltage of the input voltage, and constants are denoted by $V_{IS\_AVE}$, $V_{VCMP}$, $V_{VDET}$, and α and K, respectively, a calculation formula representing an operation of a control circuit including the multiplier and the current error amplifier circuit is expressed as follows. The formula below represents an operation itself of the power factor correction circuit where the output current ($V_{IS\_AVE}$) is proportional to the input voltage and $V_{VCMP}$ representing the magnitude of a load.

$$V_{IS\_AVE} \times \alpha = K \times V_{VCMP} \times V_{VDET}$$

Therefore, even if the average value $V_{IS\_AVE}$ over every switching period of the sensing voltage $V_{IS}$ of the inductor current does not change, the output voltage $V_{VCMP}$ from the voltage error amplifier circuit becomes one third as the input voltage $V_{VDET}$ triples.

Since input (Vref–$V_{FB}$) to the voltage error amplifier circuit and the output voltage $V_{VCMP}$ therefrom are proportional to each other in a practical use range, the input (Vref–$V_{FB}$) to the voltage error amplifier circuit also becomes one third. When the loop gain of the power factor correction circuit is defined to be the gain of the output current with respect to the input (Vref–$V_{FB}$), since, when the input voltage $V_{VDET}$ triples, the input (Vref–$V_{FB}$) becomes one third for the same $V_{IS\_AVE}$, the loop gain also triples. Since, when the loop gain is increased, a ripple in the output current is increased for the same input (Vref–$V_{FB}$), an excessive loop gain has an adverse effect on the power factor correction. On the other hand, since the loop gain can be considered to be an index indicating how large the output current variation is with respect to a variation in the output voltage, a low loop gain causes responsiveness to output variation to deteriorate.

Influence of a threefold increase in the input voltage may also be viewed in such away that, since, even if a ripple in the input (Vref–$V_{FB}$) to the voltage error amplifier circuit is the same, a ripple in multiplication output from the multiplier, to be input to the current error amplifier circuit, varies threefold, the distortion illustrated in FIG. 3C is increased and the power factor is reduced.

In order to suppress a ripple in the output from the voltage error amplifier circuit, which is a contributing factor for the deterioration in the power factor, it is possible to prevent a ripple component having a frequency twice the frequency of the AC line from appearing by connecting a phase compensation circuit constituted by a series circuit of a resistor R and a capacitor C to the output side of the voltage error amplifier circuit. However, there is a problem in that, although enabling an input ripple component in the feedback voltage $V_{FB}$ to be unlikely to appear in the output, increasing the capacitance of the capacitor C and decreasing the resistance of the resistor R and thereby reducing the gain of the voltage error amplifier circuit causes the responsiveness of the voltage error amplifier circuit to deteriorate, which causes output voltage variation to be increased upon a rapid load variation.

In addition, there is another problem in that, since the output voltage from the full-wave rectifier circuit, to be input to the multiplier, is lowered when a low input voltage is input, the loop gain becomes lower than that when a high input voltage is input and the responsiveness deteriorates.

Accordingly, the present invention has been made in view of the problems in the above-described conventional technologies and an object of the present invention is to provide a power factor correction circuit capable of maintaining loop gain properly while maintaining current sensing accuracy even when different AC input voltages are input and a switching power source device using the power factor correction circuit.

According to an aspect of the present invention, there is provided a power factor correction circuit improving a power factor by controlling a switching element in a boost chopper boosting DC voltage into which AC voltage is full-wave rectified, including: a power factor correction control circuit including an input voltage detection terminal to which voltage corresponding to input voltage to the boost chopper is input, a current sensing terminal to which voltage corresponding to inductor current in the boost chopper is input, an output voltage detection terminal to which voltage corresponding to output voltage from the boost chopper is input, and an output terminal outputting a drive signal for the switching element; and a voltage adjustment circuit configured to detect the input voltage and adjust voltage at the current sensing terminal and voltage at the input voltage detection terminal according to the detected input voltage.

In addition, according to another aspect of the present invention, there is provided a switching power source device including a power factor correction circuit having the above-described configuration.

One aspect of the present invention enables responsiveness when a low input voltage is input to be improved while achieving an improvement in a power factor by improving current sensing accuracy when a high input voltage is input.

BRIEF DESCRIPTION OF DRAWINGS

FIGS. 4A to 4F are signal waveform charts provided for description of a power factor correction operation;

DESCRIPTION OF EMBODIMENTS

Next, with reference to the accompanying drawings, an embodiment according to the present invention will be described. In the following description of the drawings, the same or similar reference signs are assigned to the same or similar composing elements.

In addition, the embodiment, which will be described below, indicate devices and methods to embody the technical idea of the present invention, and the technical idea of the present invention does not limit the materials, shapes, structures, arrangements, and the like of the constituent components to those described below. The technical idea of the present invention can be subjected to a variety of alterations within the technical scope prescribed by the claims.

Hereinafter, a switching power source device according to a first embodiment of the present invention will be described with reference to the drawings.

Figure 1:
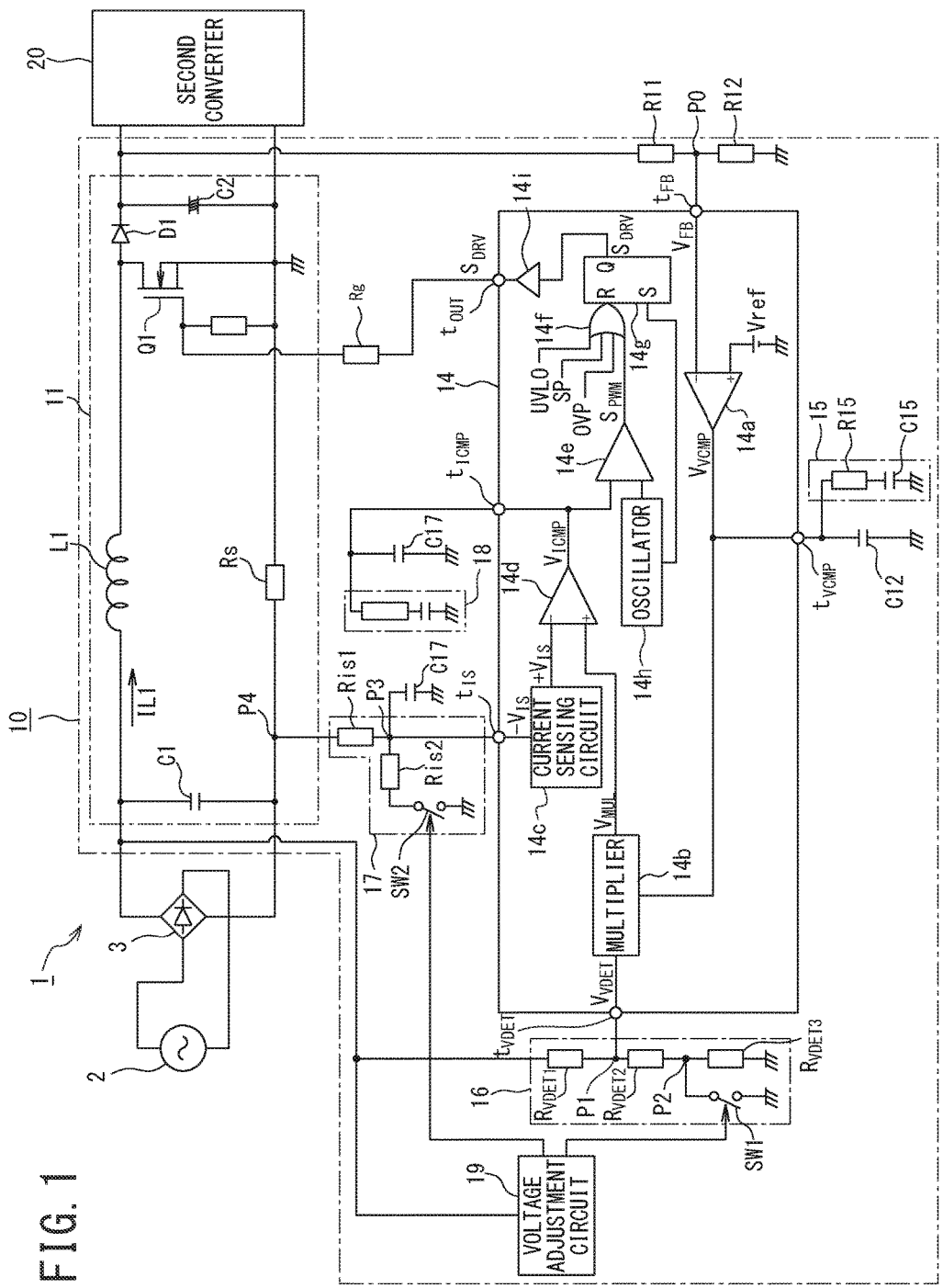
FIG. 1 is a circuit diagram illustrative of a first embodiment of a switching power source device including a power factor correction circuit according to the present invention.

As illustrated in FIG. 1, a switching power source device 1 includes an AC power source 2 and a full-wave rectifier circuit 3 that full-wave rectifies AC voltage from the AC power source 2. The switching power source device 1 also includes a first converter 10 to which DC output voltage from the full-wave rectifier circuit 3 is input, that serves as a power factor correction circuit, and that is a voltage boosting type and a second converter 20 that serves as a current resonance type converter.

The first converter 10 includes a boost chopper 11 that is connected between the positive output side and the negative output side of the full-wave rectifier circuit 3. The boost chopper 11 includes a smoothing capacitor C1 and a series circuit that is made up of an inductor L1 and a diode D1 and that is connected to the positive output side of the full-wave rectifier circuit 3. The boost chopper 11 also includes an output capacitor C2 that is connected between the cathode side of the diode D1 and the negative output side of the full-wave rectifier circuit 3 and a boosting switching element Q1 that is connected between a connection point between the inductor L1 and the anode side of the diode D1 and the negative output side of the full-wave rectifier circuit 3. Further, the first converter 10 includes a power factor correction control IC 14 that drives the boosting switching element Q1 and that serves as a power factor correction control circuit.

The power factor correction control IC 14 includes a feedback terminal $t_{FB}$ that serves as an output voltage detection terminal, a voltage error detection compensation terminal $t_{VCMP}$, an input voltage detection terminal $t_{VDET}$, a current sensing terminal $t_{IS}$, a current error detection compensation terminal $t_{ICMP}$, and an output terminal $t_{OUT}$.

To the feedback terminal $t_{FB}$, a connection point PO between voltage divider resistors R11 and R12 that are connected between an intermediate point between the output capacitor C2 and the second converter 20 and ground is connected and voltage-divided voltage of the output voltage is input as feedback voltage $V_{FB}$.

To the voltage error detection compensation terminal $t_{VCMP}$, a capacitor C12 and an RC phase compensation circuit 15 that remove a ripple component in amplified output from a voltage error amplifier 14a, which will be described later, are connected in parallel. The RC phase compensation circuit 15 has a resistor R15 and a capacitor C15 connected in series and, so as to cut a frequency band that is higher than a frequency twice an input frequency and that is included in the amplified output from the voltage error amplifier 14a, is configured to reduce gain in the frequency band to lower than 0 dB.

To the input voltage detection terminal $t_{VDET}$, input voltage detection voltage $V_{VDET}$ is input that is output from a first voltage divider circuit 16 connected between the DC positive output side of the full-wave rectifier circuit 3 and ground. The first voltage divider circuit 16 has three voltage divider resistors $R_{VDET1}$, $R_{VDET2}$, and $R_{VDET3}$ connected in series and a first switching element SW1 connected in parallel with the voltage divider resistor $R_{VDET3}$. From a connection point P1 between the voltage divider resistors $R_{VDET1}$ and $R_{VDET2}$, the input voltage detection voltage $V_{VDET}$ is output.

In the configuration, the resistance values of the voltage divider resistors $R_{VDET1}$, $R_{VDET2}$, and $R_{VDET3}$ are set in such a way that, for example, a voltage dividing ratio $(R_{VDET2}+R_{VDET3})/(R_{VDET1}+R_{VDET2}+R_{VDET3})$ when the three resistors $R_{VDET1}$, $R_{VDET2}$, and $R_{VDET3}$ are connected is twice a voltage dividing ratio $R_{VDET2}/(R_{VDET1}+R_{VDET2})$ when the resistor $R_{VDET3}$ is bypassed by the first switching element SW1.

To the current sensing terminal $t_{IS}$, a resistor Ris1 is connected to which sensing voltage across a current sensing resistor Rs that is connected between the DC negative output side of the full-wave rectifier circuit 3 and ground and that senses inductor current IL1 is input, and, in conjunction therewith, between a connection point P3 between the current sensing resistor Ris1 and the current sensing terminal $t_{IS}$ and ground, a filtering capacitor C17 is connected and a series circuit of a voltage divider resistor Ris2 and a second switching element SW2 is connected in parallel with the filtering capacitor C17. The resistors Ris1 and Ris2 and the second switching element SW2 constitute a second voltage divider circuit 17.

In the configuration, a relationship among output power Po from the first converter 10, AC input voltage Vac, and input current Iin is expressed by the formula (1) below:

$$Po = \eta \times Vac \times Iin \qquad (1)$$

where η denotes efficiency.

As evident from the formula (1), under the condition that the output power Po is constant, as the AC input voltage Vac decreases, the input current Iin increases. Conversely, as the AC input voltage Vac increases, the input current Iin decreases.

Therefore, when a low input voltage $Vin_L$ is input, the input current Iin becomes large. In general, the current sensing resistor Rs is designed to generate an optimum sensing voltage when a maximum input current Iinmax flows, the maximum input current Iinmax being generated when the AC input voltage Vac is an allowable minimum AC input voltage Vacmin (for example, AC 85 V), which maximizes the input current Iin.

In the present embodiment, the resistor Ris2 and a MOSFET Q33 serving as a switching element are connected to the input side of the current sensing terminal $t_{IS}$ of the power factor correction control IC 14 in series with the resistor Ris1 and configured to be able to constitute the second voltage divider circuit 17 when the MOSFET Q33 is in the ON state.

In the present embodiment, the resistance value of the current sensing resistor Rs is set in such a way that, when the input voltage Vac and the input current Iin are the allowable minimum AC input voltage Vacmin and the maximum input current Iinmax, respectively, voltage-divided voltage $-V_{IS}$ (negative voltage) becomes an optimum sensing voltage, the voltage-divided voltage $-V_{IS}$ being obtained by voltage-dividing voltage at a connection point P4 between the current sensing resistor Rs and the resistor Ris1 using the resistors Ris1 and Ris2 of the second voltage divider circuit 17.

To the current error detection compensation terminal $t_{ICMP}$, a capacitor C17 and an RC phase compensation circuit 18 that remove a ripple component are connected in parallel, as with the afore-described voltage error detection compensation terminal $t_{VCMP}$.

From the output terminal $t_{OUT}$, a drive signal $S_{DRV}$ that drives the boosting switching element Q1 and is pulse-width modulated is output.

In addition, the power factor correction control IC 14 includes the voltage error amplifier 14a, a multiplier 14b, a current sensing circuit 14c, a current error amplifier 14d, a PWM comparator 14e, and an RS flip-flop 14g.

To the inverting input side and the non-inverting input side of the voltage error amplifier 14a, the feedback voltage $V_{FB}$ input to the feedback terminal $t_{FB}$ and reference voltage $V_{ref}$ indicating a target output voltage are supplied, respectively. From the voltage error amplifier 14a, amplified voltage $V_{VCMP}$ obtained by amplifying difference voltage between the reference voltage $V_{ref}$ and the feedback voltage $V_{FB}$ is output. Smoothing a ripple component included in the amplified voltage $V_{VCMP}$ by means of the capacitor C12 and the RC phase compensation circuit 15 causes the amplified output $V_{VCMP}$ from the voltage error amplifier 14a to become substantially DC voltage.

To the multiplier 14b, the amplified output $V_{VCMP}$ output from the voltage error amplifier 14a and the input voltage detection voltage $V_{VDET}$ input from the input voltage detection terminal $t_{VDET}$ are input, and, from the multiplier 14b, multiplication output $V_{MUL}$ that is represented by the product of the amplified output $V_{VCMP}$ and the input voltage detection voltage $V_{VDET}$ is output. Since being obtained by multiplying the amplified output $V_{VCMP}$, which is substantially DC voltage, by the input voltage detection voltage $V_{VDET}$, to which AC voltage is full-wave rectified and which has a sinusoidally shaped waveform, the multiplication output $V_{MUL}$ comes to have a sinusoidally shaped waveform proportional to the AC input voltage.

The multiplication output $V_{MUL}$ is expressed as in the formula (2) below:

$$V_{MUL} = K \times V_{VDET} \times V_{VCMP} \quad (2)$$

where K denotes a constant.

The current sensing circuit 14c is configured with an inverting amplifier that inverting-amplifies current sensing voltage $-V_{IS}$ (negative voltage) input to the current sensing terminal $t_{IS}$, converts the negative current sensing voltage $-V_{IS}$, obtained by sensing inductance current, to positive current sensing voltage $+V_{IS}$ (although the gain of the inverting amplifier is assumed to be $-1$ for simplification of description, the absolute value of the gain may be a value other than 1 as long as inversion of positive and negative signs can be performed, and, hereinafter, the same applies), and outputs the positive current sensing voltage $+V_{IS}$ to the current error amplifier 14d.

The current error amplifier 14d, to the inverting input terminal of which is input the positive current sensing voltage $+V_{IS}$, which is output from the current sensing circuit 14c, and to the non-inverting input terminal of which is input the multiplication output $V_{MUL}$, which is output from the multiplier 14b, as a target current value, outputs amplified output $V_{ICMP}$ obtained by amplifying difference voltage between the positive current sensing voltage $+V_{IS}$ and the multiplication output $V_{MUL}$ to the PWM comparator 14e. With regard to the amplified output $V_{ICMP}$, a ripple component in the amplified output $V_{ICMP}$ is also smoothed by the capacitor C17 and the RC phase compensation circuit 18.

The PWM comparator 14e, to one input terminal of which is input the amplified output $V_{ICMP}$ from the current error amplifier 14d and to the other input terminal of which is input a sawtooth wave supplied from an oscillator 14h, outputs a PWM signal $S_{PWM}$ that is pulse-width modulated.

The PWM signal $S_{PWM}$ output from the PWM comparator 14e, in conjunction with an under voltage lock out signal UVLO monitoring an IC power source Vcc supplied to the power factor correction control IC 14, a short-circuit protection signal SP monitoring the feedback voltage $V_{FB}$ input to the feedback terminal $t_{FB}$, and an overvoltage protection signal OVP, is input to a reset terminal R of the RS flip-flop 14g via an OR gate 14f.

A pulse signal $S_{PUL}$ that is synchronous with rises of a sawtooth wave supplied from the oscillator 14h is input to a set terminal S of the RS flip-flop 14g, and a drive pulse output from an output terminal Q of the RS flip-flop 14g is output to the output terminal $t_{OUT}$ via a drive circuit 14i.

The switching element SW1, disposed in the first voltage divider circuit 16, and the switching element SW2, disposed in the second voltage divider circuit 17, are on/off controlled by a voltage adjustment circuit 19.

The voltage adjustment circuit 19 detects input voltage Vin to the boost chopper 11 and, when the input voltage Vin is on the high input voltage $Vin_H$ side where the input voltage Vin is equal to or higher than a threshold voltage Vth, controls the first switching element SW1 and the second switching element SW2 to the ON state and the OFF state, respectively. Conversely, when the input voltage Vin is on the low input voltage $Vin_L$ side where the input voltage Vin is lower than the threshold voltage Vth, the voltage adjustment circuit 19 controls the first switching element SW1 and the second switching element SW2 to the OFF state and the ON state, respectively.

Figure 2:
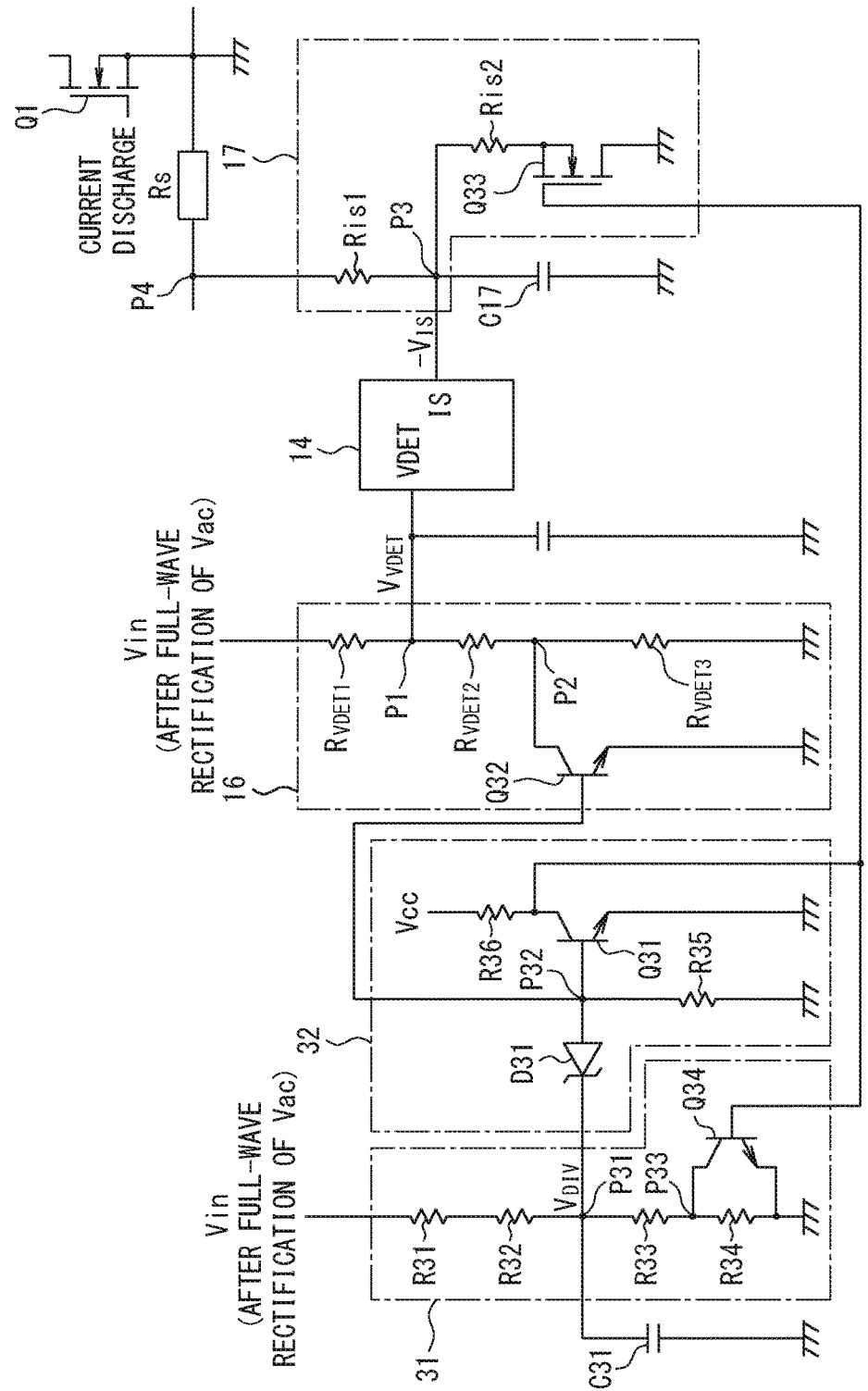
FIG. 2 is a circuit diagram illustrative of an example of a specific configuration of a voltage adjustment circuit in FIG. 1.

The voltage adjustment circuit 19 is specifically configured as illustrated in FIG. 2. That is, the voltage adjustment circuit 19 includes a third voltage divider circuit 31 to which positive voltage on the DC output side of the full-wave rectifier circuit 3 is input. The third voltage divider circuit 31 has four resistors R31 to R34 connected in series, and, from a connection point P31 between the resistors R32 and R33, voltage-divided voltage is output as input voltage detection voltage $V_{DIV}$. Between the connection point P31 between the resistors R32 and R33 and ground, a filtering capacitor C31 is connected. In addition, to the resistor R34, a bipolar transistor Q34 serving as a third switching element SW3 is connected in parallel.

The connection point P31 of the voltage divider circuit 31 is connected to a voltage control unit 32. The voltage control unit 32 includes a Zener diode D31 the cathode of which is connected to the connection point P31 of the voltage divider circuit 31, a resistor R35 that is connected between the anode of the Zener diode D31 and ground, and an NPN-type bipolar transistor Q31 the base of which is connected to a connection point P32 between the anode of the Zener diode D31 and the resistor R35. The collector of the bipolar transistor Q31 is connected to the IC power source Vcc via a collector resistor R36, and the emitter thereof is grounded. A voltage value obtained by multiplying a breakdown voltage (Zener voltage) of the Zener diode D31 by the inverse of a voltage dividing ratio of the voltage divider circuit 31 is equivalent to the above-described threshold voltage Vth.

The connection point P32 between the Zener diode D31 and the resistor R35 in the voltage control unit 32 is connected to the base of an NPN-type bipolar transistor Q32 constituting the first switching element SW1. The collector of the bipolar transistor Q32 is connected to a connection point P2 between the resistors $R_{VDET2}$ and $R_{VDET3}$ in the voltage divider circuit 16 and the emitter thereof is grounded.

In addition, the collector of the NPN-type bipolar transistor Q31 is connected to the gate of the n-channel MOSFET Q33 constituting the second switching element SW2. The source of the MOSFET Q33 is connected to the resistor Ris2 constituting the voltage divider circuit 17 and the drain thereof is grounded. In the configuration, since the source potential of the MOSFET Q33 decreases to approximately −1 V at most when the circuit is in operation, an element that has a high gate threshold value Vth (for example, equal to or higher than 2 V) is used as the MOSFET Q33.

Further, the collector of the NPN-type bipolar transistor Q31 is connected to the base of the NPN-type bipolar transistor Q34 constituting the third switching element SW3. The collector of the NPN-type bipolar transistor Q34 is connected to a connection point P33 between the resistors R33 and R34 in the voltage divider circuit 31 and the emitter thereof is grounded.

Operations of the voltage adjustment circuit 19 having the above-described configuration will be described for cases where different voltages, a low AC input voltage $Vac_L$ of, for example, 100 V and a high AC input voltage $Vac_H$ of, for example, 200 V, are applied to the full-wave rectifier circuit 3.

First, in a state where no AC power is supplied to the full-wave rectifier circuit 3, operations of the boost chopper 11, the power factor correction control IC 14, and the voltage adjustment circuit 19 are also suspended because the input voltage Vin from the full-wave rectifier circuit 3 is zero and, in conjunction therewith, the voltage of the IC power source Vcc is also zero.

When a low AC voltage of AC 100 V is input to the full-wave rectifier circuit 3 from the AC power source 2 while the circuits are in the operation suspension state, the AC input voltage Vac is full-wave rectified by the full-wave rectifier circuit 3 into the input voltage Vin having a low input voltage $Vin_L$ of DC 100 V. This operation causes the IC power source Vcc to be supplied from a not-illustrated power source circuit.

The low input voltage $Vin_L$ is input to the voltage divider circuit 31 in the voltage adjustment circuit 19. When it is assumed that the bipolar transistor Q34 is in the OFF state at this time, the resistors R31 to R34 are in a state of being connected in series and the voltage divider circuit 31 is in a state of having a high voltage dividing ratio. However, the voltage dividing ratio in this case is set in such a way that the voltage-divided voltage $V_{DIV}$ at the connection point P31 of the voltage divider circuit 31 is lower than the breakdown voltage (equivalent to a voltage-divided voltage of the threshold voltage) of the Zener diode D31. Therefore, the Zener diode D31 does not reversely conduct. For this reason, potential at the connection point P32 between the Zener diode D31 and the resistor R35 is equal to a ground potential, which causes the bipolar transistors Q31 and Q32 to be in the OFF state.

The bipolar transistor Q31 being in the OFF state causes the collector potential of the bipolar transistor Q31 to be equal to an IC power source potential Vcc, which brings the MOSFET Q33 and the bipolar transistor Q34 to the ON state.

The bipolar transistor Q34 being in the ON state causes the resistor R34 in the third voltage divider circuit 31 to be bypassed and the resistors constituting the third voltage divider circuit 31 to be reduced to three resistors R31 to R33, which causes the voltage dividing ratio to be lowered and the voltage-divided voltage $V_{DIV}$ output from the connection point P31 to be reduced. For this reason, the voltage-divided voltage $V_{DIV}$ becomes sufficiently lower than the breakdown voltage of the Zener diode D31, which enables the Zener diode D31 to be surely prevented from reversely conducting. Note that, although it was assumed that the bipolar transistor Q34 was in the OFF state at first, when the bipolar transistor Q34 is in the ON state, since the voltage-divided voltage $V_{DIV}$ at the connection point P31 in the voltage divider circuit 31 becomes further lower than the breakdown voltage (equivalent to a divided voltage of the threshold voltage) of the Zener diode D31 and the Zener diode D31 does not reversely conduct either, the bipolar transistor Q34 is kept in the ON state through a similar operation to that described above.

In addition, the MOSFET Q33 being in the ON state causes the resistors Ris1 and Ris2 to be connected to the input side of the current sensing terminal $t_{IS}$ of the power factor correction control IC 14, which causes the second voltage divider circuit 17 to be constituted.

Therefore, an increase in the input current Iin caused by the application of the low AC input voltage $Vac_L$ of AC 100 V, as expressed by the afore-described formula (1), causes an increase in the absolute value of voltage sensed by the current sensing resistor Rs. Negative voltage $-V_{IS}$ into which the sensed voltage is voltage-divided, for example, in half by means of the second voltage divider circuit 17 is input to the current sensing terminal $t_{IS}$. Therefore, the voltage that is input to the current sensing terminal $t_{IS}$ becomes a current sensing voltage equivalent to a current sensing voltage $V_{IS}$ when the high AC input voltage $Vac_H$ of AC 200 V is applied.

In addition, the bipolar transistor Q32, in the first voltage divider circuit 16 disposed on the input side of the input voltage detection terminal $t_{VDET}$ of the power factor correction control IC 14, being in the OFF state causes the voltage dividing ratio to be determined by three resistors $R_{VDET1}$, $R_{VDET2}$, and $R_{VDET3}$. For this reason, assuming that the input voltage Vin is 100 V and the resistance values of the respective resistors $R_{VDET1}$, $R_{VDET2}$, and $R_{VDET3}$ are, for example, 3300Ω, 34Ω, and 34Ω, respectively, the input voltage detection voltage $V_{VDET}$ output from the connection point P1 has a peak value of approximately 2 V.

On the other hand, when a high AC voltage of AC 200V is input to the full-wave rectifier circuit 3 from the AC power source 2 while the circuits are in the operation suspension state, the AC input voltage Vac is full-wave rectified by the full-wave rectifier circuit 3 into the input voltage Vin having a high input voltage $Vin_H$ of DC 200V. This operation causes the IC power source Vcc to be supplied from a not-illustrated power source circuit.

The high input voltage $Vin_H$ is input to the voltage divider circuit 31 in the voltage adjustment circuit 19. Considering that the high input voltage $Vin_H$ rises from zero, the bipolar transistor Q34 is brought to the ON state at the initial stage of the rise through a similar operation to that in the case of the above-described low AC input voltage $Vac_L$ of AC 100 V. Although, at this time, the voltage divider circuit 31 is in a state of being constituted by only the resistors R31 to R33 and having a small voltage dividing ratio, the voltage dividing ratio of the resistors R31 to R33 is set so that, when the high input voltage $Vin_H$ exceeds 100 V and rises to a certain level of voltage, the voltage-divided voltage $V_{DIV}$ at the connection point P31 in the voltage divider circuit 31 becomes higher than the breakdown voltage of the Zener diode D31. Thus, when the high input voltage $Vin_H$ of DC 200 V is applied, the Zener diode D31 reversely conducts eventually. For this reason, the potential at the connection point P32 between the Zener diode D31 and the resistor R35 becomes a high potential, which causes the bipolar transistors Q31 and Q32 to be brought to the ON state.

The bipolar transistor Q31 being in the ON state causes the collector potential of the bipolar transistor Q31 to be brought to the ground potential, which brings the MOSFET Q33 and the bipolar transistor Q34 to the OFF state. The bipolar transistor Q34 being in the OFF state causes the voltage-divided voltage $V_{DIV}$ at the connection point P31 in the voltage divider circuit 31 to become further higher than the breakdown voltage of the Zener diode D31, which enables the Zener diode D31 to be surely prevented from being cut off.

In addition, the MOSFET Q33 being in the OFF state brings the second voltage divider circuit 17 to a state where only the resistor Ris1 is connected to the input side of the current sensing terminal $t_{IS}$ of the power factor correction control IC 14.

A decrease in the input current Iin caused by the application of the high AC input voltage $Vac_H$ of AC 200 V, as expressed by the afore-described formula (1), causes a decrease in the absolute value of voltage sensed by the current sensing resistor Rs. The sensed voltage is input to the current sensing terminal $t_{IS}$ as it is as the current sensing voltage $-V_{IS}$ via the resistor Ris1. This state is considered to be equivalent to a case where, regarding the voltage divider circuit constituted by the resistors Ris1 and Ris2, the resistance value of the resistor Ris2 becomes infinity and the voltage dividing ratio (Ris2/(Ris1+Ris2)) becomes 1. Therefore, the sensed voltage becomes a current sensing voltage equivalent to a current sensing voltage $V_{IS}$ sensed when the low AC input voltage $Vac_L$ of AC 100 V is applied.

In addition, the bipolar transistor Q32, in the first voltage divider circuit 16 disposed on the input side of the input voltage detection terminal $t_{VDET}$ of the power factor correction control IC 14, being in the ON state causes the resistor $R_{VDET3}$ to be bypassed and the voltage dividing ratio to be determined by two resistors $R_{VDET1}$ and $R_{VDET2}$, and, assuming that the resistance values of the respective resistors $R_{VDET1}$ and $R_{VET2}$ are 3300Ω and 38Ω, respectively, the input voltage detection voltage $V_{VDET}$ output from the connection point P1 comes to have a peak value of approximately 2 V, which is approximately equal to a value when the afore-described low input voltage $Vin_L$ is input.

Therefore, the voltage adjustment circuit 19 enables the input voltage detection voltage $V_{VDET}$ input to the input voltage detection terminal $V_{VDET}$ of the power factor correction control IC 14 to be approximately the same and, in conjunction therewith, the current sensing voltage $-V_{IS}$ input to the current sensing terminal $t_{IS}$ to be approximately the same between when the low AC input voltage $Vac_L$ of 100 V is input to the full-wave rectifier circuit 3 and when the high AC input voltage $Vac_H$ of 200 V is input to the full-wave rectifier circuit 3.

Next, an operation of the switching power source in the above-described first embodiment will be described.

Figure 3A:
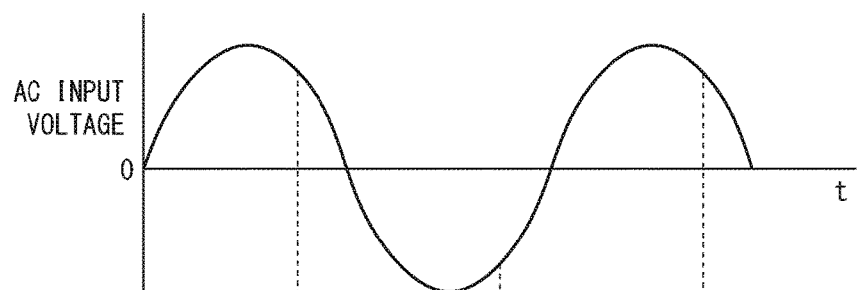
FIGS. 3A to 3C are waveform charts illustrative of AC input voltage, output voltage, and AC input current of a boost chopper.

An AC input voltage Vac illustrated in FIG. 3A is supplied to the full-wave rectifier circuit 3 from the AC power source 2, and a full-wave rectified voltage (not illustrated) shaped as a half-wave sinusoidal wave that is obtained by folding the negative side of the AC input voltage Vac illustrated in FIG. 3A onto the positive side thereof is input as the input voltage Vin from the full-wave rectifier circuit 3. The input voltage Vin is boosted by the boost chopper 11, which is constituted by the inductor L1 and the switching element Q1, passes the diode D1, is smoothed by the output capacitor C2, and is supplied to the second converter 20 as constant output power having substantially DC voltage. The second converter 20 is configured with, for example, an LLC current resonance type converter including a resonance capacitor, an insulation transformer, and switching elements and outputs stabilized DC power from the secondary side of the transformer.

In the boost chopper 11, the drive signal $S_{DRV}$ output from the output terminal $t_{OUT}$ of the power factor correction control IC 14 is a square-wave signal that repeats ON (H level) and OFF (L level) as illustrated in FIG. 4A. When the drive signal $S_{DRV}$ is in the OFF sate, the switching element Q1 is in the OFF state and drain-source voltage Vds becomes approximately equal to voltage across the output capacitor C2, as illustrated in FIG. 4B. Conversely, when the drive signal $S_{DRV}$ is in the ON sate, the switching element Q1 is in the ON state and the drain-source voltage Vds becomes 0, which is a ground potential, as illustrated in FIG. 4B.

During a period in which the switching element Q1 is in the ON state, current flows through the inductor L1 and the switching element Q1 and magnetic energy is stored in the inductor L1. For this reason, the inductor current IL1 increases with time as illustrated in FIG. 4C. During a period in which the switching element Q1 is in the OFF state, magnetic energy stored in the inductor L1 is discharged and charged into the output capacitor C2 through the diode D1. For this reason, the inductor current IL1 decreases with time as illustrated in FIG. 4C.

On the other hand, in the power factor correction control IC 14, the output voltage from the boost chopper 11 is voltage-divided by the voltage divider resistors R11 and R12 and input to the feedback terminal $t_{FB}$ as the feedback voltage $V_{FB}$.

Figure 3B:
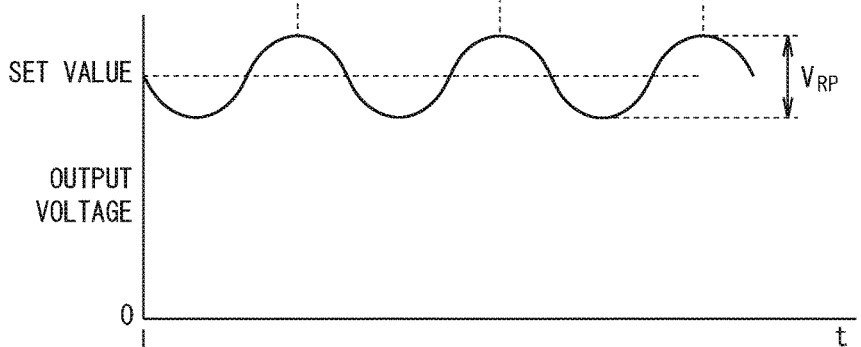
Figure 3C:
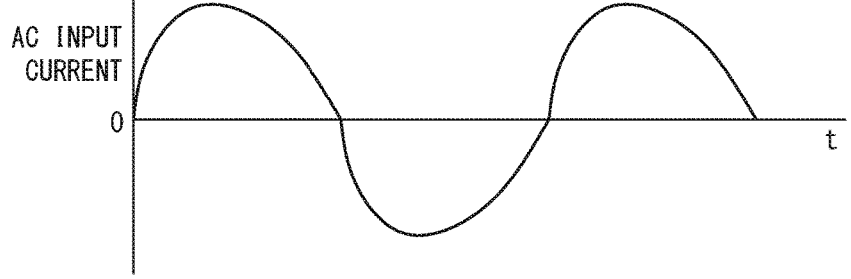

Since, on this occasion, the first converter 10 performs current control for approximating an output current waveform to the waveform of the input voltage (which has a frequency twice the AC frequency because the input voltage is a voltage into which the AC voltage is full-wave rectified) (that is, approximating the power factor to 1), a ripple having a frequency twice the AC frequency is generated on the output voltage, as illustrated in FIG. 3B. Since the ripple is also input to the feedback voltage $V_{FB}$, the current waveform becomes distorted like an AC input current waveform illustrated in FIG. 3C, and the power factor deteriorates.

The feedback voltage $V_{FB}$ is supplied to the voltage error amplifier 14a, and, from the voltage error amplifier 14a, output voltage $V_{VCMP}$ obtained by amplifying difference voltage between the feedback voltage $V_{FB}$ and reference voltage $V_{ref}$ is output.

A ripple component included in the output voltage $V_{VCMP}$ is smoothed by the capacitor C12 and the RC phase compensation circuit 15 that are connected to the phase adjustment terminal $t_{VCMP}$.

In the phase compensation circuit 15, increasing the capacitance of the capacitor C15 and decreasing the resistance value of the resistor R15 causes the gain of the voltage error amplifier 14a to be decreased, which enables a ripple component in the feedback voltage $V_{FB}$ input to the feedback terminal $t_{FB}$ to be unlikely to appear in the output. However, since a decrease in the gain of the voltage error amplifier 14a causes the responsiveness of the voltage error amplifier 14a to deteriorate, rapid load variation causes large variation in the output voltage.

For this reason, the capacitance value and the resistance value of the phase compensation circuit 15 are set at proper values that enable the responsiveness of the voltage error amplifier 14a to be secured.

The output voltage $V_{VCMP}$ that is approximately DC voltage obtained by removing a ripple component included in the output voltage $V_{VCMP}$ from the voltage error amplifier 14a by means of the capacitor C12 and the phase compensation circuit 15 is input to the multiplier 14b.

On the other hand, the input voltage Vin output from the full-wave rectifier circuit 3 is input to the voltage divider circuit 16. The bipolar transistor Q32, which constitutes the first switching element SW1 connected to the voltage divider circuit 16, is controlled by the voltage adjustment circuit 19, as described afore. For this reason, the input voltage detection voltage $V_{VDET}$, which is input to the input voltage detection terminal $V_{VDET}$ of the power factor correction control IC 14, becomes a sinusoidally-shaped input voltage detection voltage $V_{VDET}$ having substantially the same value, regardless of whether the AC voltage input from the AC power source 2 is 100 V or 200 V.

The input voltage detection voltage $V_{VDET}$ is input to the multiplier 14b. The multiplier 14b multiplies the output voltage $V_{VCMP}$, which has been output from the voltage error amplifier 14a and has become substantially DC voltage with a ripple component removed, by the input voltage detection voltage $V_{VDET}$, which is sinusoidally shaped, as expressed by the afore-described formula (2). Therefore, the multiplication output $V_{MUL}$ output from the multiplier 14b also becomes sinusoidally shaped and proportional to the AC input voltage.

The multiplication output $V_{MUL}$ output from the multiplier 14b is input to the non-inverting input terminal of the current error amplifier 14d. To the inverting input terminal of the current error amplifier 14d, the input current sensing voltage $+V_{IS}$, which is obtained by inverting-amplifying the input current sensing voltage $-V_{IS}$ input to the current sensing terminal $t_{IS}$ by means of the current sensing circuit 14c, is input. The input current sensing voltage $-V_{IS}$, as described afore, also becomes approximately the same voltage value regardless of whether the AC voltage is the low AC input voltage $Vac_L$ of 100 V or the high AC input voltage $Vac_H$ of 200 V, by controlling whether or not to connect the voltage divider resistor Ris2 by means of the voltage adjustment circuit 19.

The current error amplifier 14d amplifies difference voltage between the multiplication output $V_{MUL}$ and the input current sensing voltage $+V_{IS}$ and outputs the output voltage $V_{ICMP}$. From the output voltage $V_{ICMP}$, a ripple component is removed by the capacitor C17 and the phase compensation circuit 18, as illustrated in FIG. 4D. The output voltage $V_{ICMP}$ from which a ripple component is removed is input to the PWM comparator 14e.

The output voltage $V_{ICMP}$ is pulse-width modulated by the PWM comparator 14e by being compared with the sawtooth wave signal $S_{OSC}$, illustrated in FIG. 4D, that is input from the oscillator 14h, and the PWM signal $S_{PWM}$ illustrated in FIG. 4E is output from the PWM comparator 14e. The PWM signal $S_{PWM}$ is supplied to the reset terminal of the RS flip-flop 14g via the OR gate 14f.

To the set terminal of the RS flip-flop 14g, the pulse signal $S_{PUL}$, which is illustrated in FIG. 4F and the pulses of which are obtained at points of time when the sawtooth wave turns to rises, is input from the oscillator 14h. In the configuration, although the under voltage lock out signal UVLO, the short-circuit protection signal SP, and the over voltage protection signal OVP are input to the OR gate 14f, the signals are kept at the L (low) level in a normal operation and turn to the H (high) level in a protective state. When any of the under voltage lock out signal UVLO, the short-circuit protection signal SP, the over voltage protection signal OVP, and the output from the PWM comparator 14e turns to the H level, the RS flip-flop 14g is reset and the switching element Q1 is brought to the OFF state.

Therefore, unless in a protective state, the RS flip-flop 14g is set by the pulse signal $S_{PUL}$, which is output from the oscillator 14h, and reset by the pulse width modulation signal $S_{PWM}$, which is output from the PWM comparator 14e. Therefore, the drive signal $S_{DRV}$ output from the affirmative output terminal Q of the RS flip-flop 14g turns to the ON state (H level) at a point of time t2, as illustrated in FIG. 4A.

Subsequently, the sawtooth wave signal $S_{OSC}$ becoming equal to or higher than the output voltage $V_{ICMP}$ from the current error amplifier 14d at a point of time t3 causes the PWM signal $S_{PWM}$ to turn to the H level, which causes the RS flip-flop 14g to be reset and the drive signal $S_{DRV}$ to turn to the OFF state (L level).

Subsequently, the sawtooth wave signal $S_{OSC}$ becoming lower than the output voltage $V_{ICMP}$ from the current error amplifier 14d at a point of time t4 causes the PWM signal $S_{PWM}$ to turn to the L level, and, subsequently, the pulse signal $S_{PUL}$ output from the oscillator 14h causes the RS flip-flop 14g to be set at a point of time t5. For this reason, the drive signal $S_{DRV}$ turns to the ON state again.

Subsequently, the PWM signal $S_{PWM}$ turning to the H level at a point of time t6 causes the RS flip-flop 14g to be reset and the drive signal $S_{DRV}$ to turn to the OFF state.

As described above, according to the above-described embodiment, it is possible to control the voltage level of the input voltage detection voltage $V_{VDET}$ input to the input voltage detection terminal $V_{VDET}$ of the power factor correction control IC 14 to be approximately equal between when the AC voltage input to the full-wave rectifier circuit 3 is the low AC input voltage $Vac_L$ of 100 V and when the AC voltage input to the full-wave rectifier circuit 3 is the high AC input voltage $Vac_H$ of 200 V. It is also possible to control the voltage level of the current sensing voltage $-V_{IS}$ input to the current sensing terminal $t_{IS}$ of the power factor correction control IC 14 to be approximately equal between when the AC voltage input to the full-wave rectifier circuit 3 is the low AC input voltage $Vac_L$ of 100 V and when the AC voltage input to the full-wave rectifier circuit 3 is the high AC input voltage $Vac_H$ of 200 V.

When it is assumed that the average value over every switching period of the positive current sensing voltage $V_{IS}$ calculated from the current sensing voltage $-V_{IS}$ (negative voltage) input to the current sensing terminal $t_{IS}$, the output voltage from the voltage error amplifier 14a, and the input voltage detection voltage at the input voltage detection terminal $t_{VDET}$ are denoted by $V_{IS\_AVE}$ (hereinafter, simply referred to as average value $V_{IS\_AVE}$), $V_{VCMP}$, and $V_{VDET}$, respectively, the calculation formula of power factor correction control performed by the power factor correction control IC 14 is expressed by the formula (3) below, as described above:

$$V_{IS\_AVE} \times \alpha = K \times V_{VCMP} \times V_{VDET} \quad (3)$$

where $\alpha$ and K denotes constants.

Figure 5:
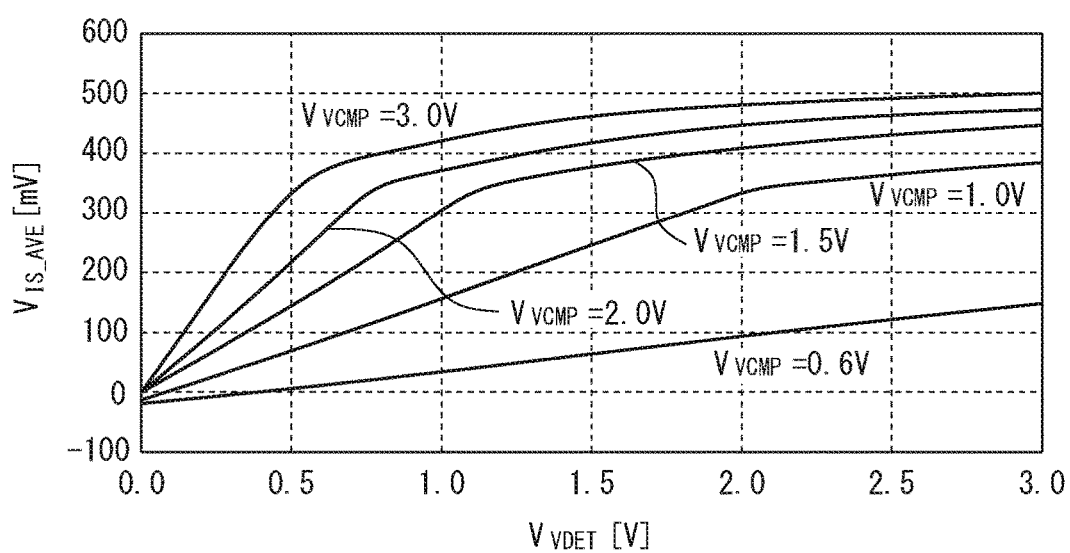
FIG. 5 is a characteristic line diagram representative of relationships between input voltage detection voltage $V_{VDET}$ and average value $V_{IS\_AVE}$ [mV] over every switching period of positive current sensing voltage $V_{IS}$ calculated from current sensing voltage $-V_{IS}$ input to a current sensing terminal $t_{IS}$ using output voltage $V_{VCMP}$ from a voltage error amplifier 14a as a parameter.

The relationship between the input voltage detection voltage $V_{VDET}$ [V] and the average value $V_{IS\_AVE}$ [mV] of the current sensing voltage $V_{IS}$ expressed using the output voltage $V_{VCMP}$ from the voltage error amplifier 14a as a parameter may be illustrated as in FIG. 5.

In FIG. 5, a range of the average value $V_{IS\_AVE}$ of the current sensing voltage $V_{IS}$ that is actually used is from 0 mV to 300 mV, that is, a region in which characteristic lines are linear. When the average value $V_{IS\_AVE}$ of the current sensing voltage $V_{IS}$ exceeds 300 mV and increases further, a reduction in the constant K of the multiplier 14b causes the characteristic lines to become curved lines, and, when the average value $V_{IS\_AVE}$ of the current sensing voltage $V_{IS}$ reaches 500 mV, overcurrent protection sets off and the characteristic lines settle to constant values.

The above-described formula (3) reveals that, even if the average value $V_{IS\_AVE}$ of the current sensing voltage $V_{IS}$ does not change, the output voltage $V_{VCMP}$ from the voltage error amplifier 14a is halved as the input voltage detection voltage $V_{VDET}$ doubles.

The output from the voltage error amplifier 14a is proportional to the input (Vref–$V_{FB}$) thereto in a practical use range. For this reason, the output voltage $V_{VCMP}$ from the voltage error amplifier 14a being halved indicates that the input (Vref–$V_{FB}$) to the voltage error amplifier 14a is also halved. This means that the gain (loop gain) between the input (Vref–$V_{FB}$) to the voltage error amplifier 14a and the output current doubles.

Thus, when the input voltage detection voltage $V_{VDET}$ doubles, the current sensing voltage $V_{IS}$ is caused to vary twofold even for a ripple at the same level in the input (Vref–$V_{FB}$), which causes harmonic current to increase and the power factor to deteriorate.

However, in the present embodiment, since the input voltage detection voltage $V_{VDET}$ input to the input voltage detection terminal $t_{VDET}$ of the power factor correction control IC 14 takes approximately the same value between when the AC input voltage Vac is the low AC input voltage $Vac_L$ of 100 V and when the AC input voltage Vac is the high AC input voltage $Vac_H$ of 200 V, excessive variation in the current sensing voltage $V_{IS}$ when the input voltage doubles may be suppressed and an increase in harmonic current may thus be suppressed. A reduction in the power factor when the high AC input voltage $Vac_H$ is input may also be suppressed.

That is, when the high AC input voltage $Vac_H$ is input, the absolute value of the current sensing voltage $-V_{IS}$ input to the current sensing terminal $t_{IS}$ of the power factor correction control IC 14 may be raised to the absolute value of a voltage as high as the current sensing voltage $-V_{IS}$ when the low AC input voltage $Vac_L$ is input, even for the same output power Po. For this reason, since the input voltage detection voltage $V_{VDET}$ does not change, the output voltage $V_{VCMP}$ from the voltage error amplifier 14a is raised, from the afore-described formula (3). Therefore, the input (Vref–$V_{FB}$) to the voltage error amplifier 14a is also raised, which causes the loop gain between the input (Vref–$V_{FB}$) and the output current to be reduced. For this reason, the occurrence of harmonics may be further suppressed.

On this occasion, it is not required to increase the capacity of the capacitance C and to decrease the resistance of the resistor R in the phase compensation circuit 15 with respect to the output voltage $V_{VCMP}$ from the voltage error amplifier 14a lest a ripple component having a frequency twice as high as the frequency of the AC line appears, and a reduction in the gain of the voltage error amplifier 14a and a reduction in the responsiveness may thus be suppressed.

In addition, since the current sensing voltage $V_{IS}$ may be set at a high value so as to compensate a decrease in the inductor current when the high AC input voltage $Vac_H$ is input, current sensing accuracy may be secured.

Conversely, when the low AC input voltage $Vac_L$ is input, the input voltage detection voltage $V_{VDET}$ input to the input voltage detection terminal $t_{VDET}$ of the power factor correction control IC 14 may be raised. The input voltage detection voltage $V_{VDET}$ being raised causes the output voltage $V_{VCMP}$ from the voltage error amplifier 14a to be lowered, from the afore-described formula (3). Since the input (Vref–$V_{FB}$) to the voltage error amplifier 14a is thus also lowered, the loop gain between the input (Vref–$V_{FB}$) and the output current is raised, which enables the responsiveness to be secured.

Conventional power factor correction circuits have been in a trade-off relationship where, when the AC input voltage Vac is high, the loop gain becomes too high, causing the power factor to deteriorate, or, when the AC input voltage Vac is low, the loop gain becomes too low, causing the responsiveness to deteriorate. In addition, with respect to sensing accuracy of the current sensing voltage $V_{IS}$, there has also been a problem in that, when a current sensing circuit is tuned to one of a high AC input voltage Vac and a low AC input voltage Vac, the accuracy at the other input voltage is reduced. Since there are a plurality of states to be coped with, it has been difficult to achieve an optimization for all the states at the same time. On the other hand, the present invention enables the above-described trade-off relationships to be dissolved and an optimum state to be achieved.

Note that, in the above-described embodiment, a case where, in order to reduce the combined resistance value between the connection point P1 of the first voltage divider circuit 16 and ground, the resistor $R_{VDET3}$ was bypassed using the first switching element SW1 was described. However, the present invention is not limited to the above-described configuration, and, as illustrated in FIG. 6, may be configured in such a way that the combined resistance value is decreased by connecting an adjustment resistor $R_{VDET3}$ in parallel with the resistor $R_{VDET2}$ in the first voltage divider circuit 16 using the first switching element SW1.

Figure 6:
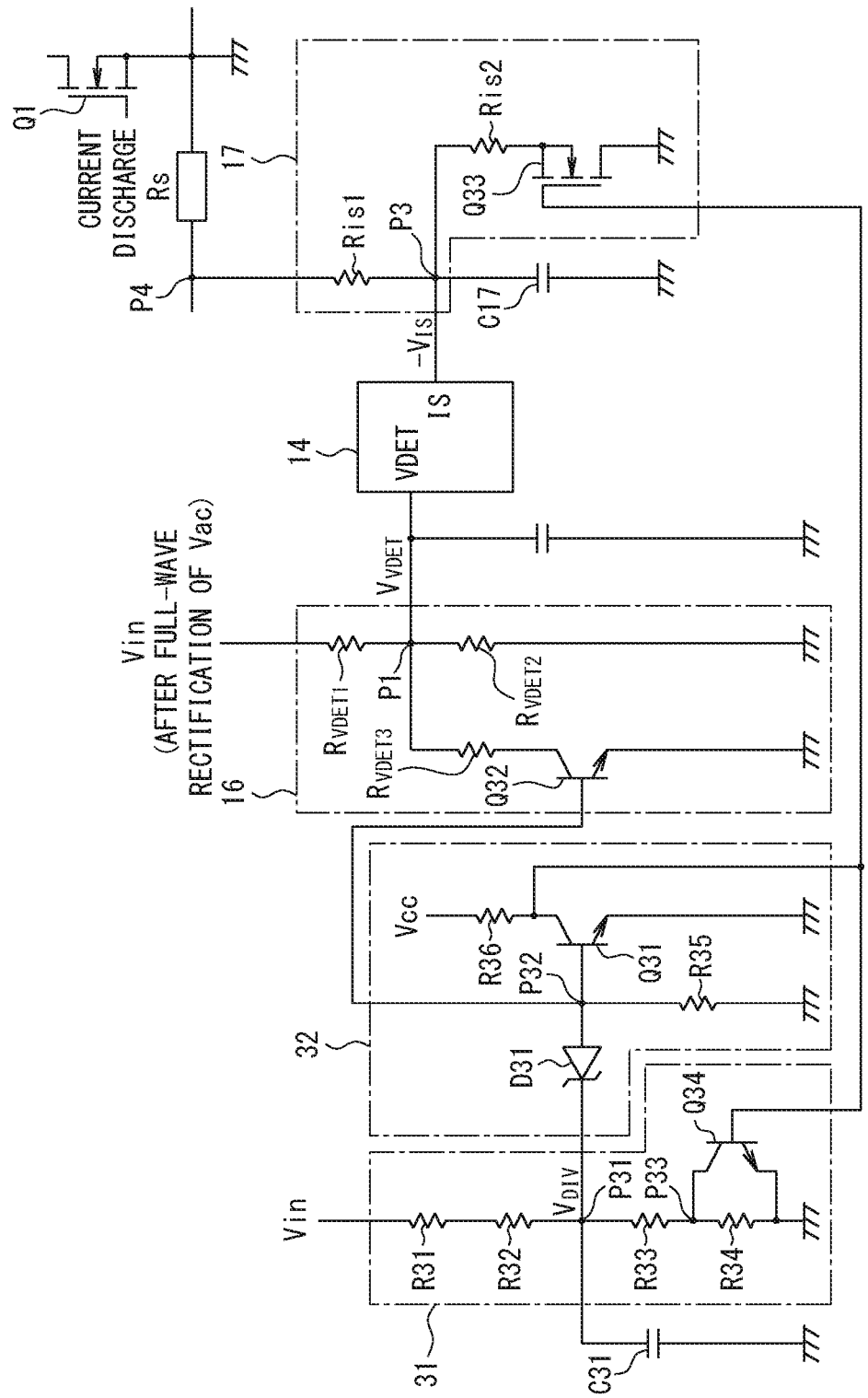
FIG. 6 is a circuit diagram illustrative of a variation of the voltage adjustment circuit.

That is, the circuit in FIG. 6 has the same configuration as that in FIG. 2 except a difference that a series circuit of the adjustment resistor $R_{VDET3}$ and the bipolar transistor Q32 constituting the first switching element SW1 is connected in parallel with the resistor $R_{VDET2}$.

In the configuration in FIG. 6, when the input voltage Vin is the low input voltage $Vin_L$, both the bipolar transistors Q31 and Q32 are in the OFF state. For this reason, the first voltage divider circuit 16 is in a state where the resistors $R_{VDET1}$ and $R_{VDET2}$ are connected in series and the voltage dividing ratio $(=R_{VDET2}/(R_{VDET1}+R_{VDET2}))$ is large. Therefore, the input voltage detection voltage $V_{VDET}$ may be raised.

On the other hand, when the input voltage Vin is the high input voltage $Vin_H$, both the bipolar transistors Q31 and Q32 are in the ON state. For this reason, in the first voltage divider circuit 16, the adjustment resistor $R_{VDET3}$ is caused to be connected to the resistor $R_{VET2}$ in parallel, and, when it is assumed that, for example, the resistor $R_{VDET2}$ and the adjustment resistor $R_{VDET3}$ have the same resistance value, the combined resistance value between the connection point P1 and ground is reduced to a half of the resistance value of the resistor $R_{VDET2}$. For this reason, the voltage dividing ratio ($=0.5R_{VDET2}/(R_{VDET1}+0.5R_{VDET2})$) is decreased to a small value. Therefore, the input voltage detection voltage $V_{VDET}$ may be lowered.

Accordingly, the input voltage detection voltage $V_{VDET}$ may be adjusted in a similar manner to the afore-described configuration in FIG. 2.

In addition, although, in the above-described embodiment, bipolar transistors were applied to the switching elements Q31, Q32, and Q34, other switching elements, such as a MOSFET, may be applied.

Further, although, in the above-described embodiment, a case where the input voltage detection voltage $V_{VDET}$ and the current sensing voltage $V_{IS}$ were adjusted to two levels according to the input voltage was described, the present invention is not limited to the embodiment, and it may be configured such that the input voltage detection voltage $V_{VDET}$ and the current sensing voltage $V_{IS}$ are adjusted to three or more levels according to the input voltage.

Furthermore, in the above-described embodiment, the adjustment was performed so that the input voltage detection voltage $V_{VDET}$ and the current sensing voltage $V_{IS}$ had approximately the same values between when the input AC voltage was 100 V and when the input AC voltage was 200 V. However, in the present invention, it is not always required to adjust the input voltage detection voltage $V_{VDET}$ and the current sensing voltage $V_{IS}$ to the same values, and the voltages may be respectively adjusted so as to satisfy requirement specifications therefor by decreasing the loop gain when the high input voltage is input and increasing the loop gain when the low input voltage is input.

REFERENCE SIGNS LIST

1 Switching power source device
2 AC power source
3 Full-wave rectifier circuit
10 First converter
11 Boost chopper
14 Power factor correction control IC
14a Voltage error amplifier
14b Multiplier
14c Current sensing circuit
14d Current error amplifier
14e PWM comparator
14f OR gate
14g RS flip-flop
14h Oscillator
14i Drive circuit
15 Phase compensation circuit
16 First voltage divider circuit
17 Second voltage divider circuit
18 Phase compensation circuit
19 Voltage adjustment circuit
31 Third voltage divider circuit
32 Voltage control unit
20 Second converter

The invention claimed is:

1. A power factor correction circuit improving a power factor by controlling a switching element in a boost chopper boosting DC voltage into which AC voltage is full-wave rectified, comprising:

a power factor correction control circuit including an input voltage detection terminal to which voltage corresponding to input voltage to the boost chopper is input, a current sensing terminal to which voltage corresponding to inductor current in the boost chopper is input, an output voltage detection terminal to which voltage corresponding to output voltage from the boost chopper is input, and an output terminal outputting a drive signal for the switching element; and a voltage adjustment circuit configured to detect the input voltage and adjust voltage at the current sensing terminal and voltage at the input voltage detection terminal according to the detected input voltage.

2. The power factor correction circuit according to claim 1, wherein the voltage adjustment circuit is configured to, when input voltage is high, raise a ratio of voltage at the current sensing terminal to the inductor current and lower a ratio of voltage at the input voltage detection terminal to the input voltage.

3. The power factor correction circuit according to claim 1, wherein the voltage adjustment circuit includes a first voltage divider circuit configured to voltage-divide the input voltage input to the input voltage detection terminal and a second voltage divider circuit configured to output voltage input to the current sensing terminal and is configured to, when input voltage equal to or higher than a threshold voltage is input, decrease a voltage dividing ratio of the first voltage divider circuit and increase a voltage dividing ratio of the second voltage divider circuit.

4. The power factor correction circuit according to claim 3, wherein the voltage adjustment circuit includes a third voltage divider circuit configured to voltage-divide the input voltage and a voltage control unit configured to detect a voltage-divided voltage from the third voltage divider circuit and adjust voltage dividing ratios of the first voltage divider circuit and the second voltage divider circuit.

5. The power factor correction circuit according to claim 4, wherein the voltage control unit includes a resistor constituting the second voltage divider circuit and including one end connected to the current sensing terminal, a second switching element configured to ground the other end of the resistor, and a first switching element configured to bypass some of a plurality of voltage divider resistors constituting the first voltage divider circuit.

6. The power factor correction circuit according to claim 4, wherein the voltage control unit includes a resistor constituting the second voltage divider circuit and including one end connected to the current sensing terminal, a second switching element configured to ground the other end of the resistor, and a third switching element configured to connect an adjustment resistor in parallel with some of a plurality of voltage divider resistors constituting the first voltage divider circuit.

7. A switching power source device comprising the power factor correction circuit according to claim 1.

8. A switching power source device comprising the power factor correction circuit according to claim 2.

9. A switching power source device comprising the power factor correction circuit according to claim 3.

10. A switching power source device comprising the power factor correction circuit according to claim 4.

11. A switching power source device comprising the power factor correction circuit according to claim 5.

12. A switching power source device comprising the power factor correction circuit according to claim 6.

13. The power factor correction circuit according to claim 1, further comprising:
   a first voltage divider circuit having a first plurality of resistors and a first switch to control a voltage dividing ratio of the first voltage divider circuit,
   wherein
   the input voltage detection terminal is connected to a first connection point between adjacent resistors among the first plurality of resistors of the first voltage divider circuit, and
   the voltage adjustment circuit is connected to the first switch of the first voltage divider circuit to control an on and off state of the first switch to adjust the voltage at the input voltage detection terminal.

14. The power factor correction circuit according to claim 13, wherein the power factor correction circuit further includes:
   a second voltage divider circuit having a second plurality of resistors and a second switch to control a voltage dividing ratio of the second voltage divider circuit,
   wherein
   the current sensing terminal is connected to a second connection point between adjacent resistors among the second plurality of resistors of the second voltage divider circuit, and
   the voltage adjustment circuit is connected to the second switch of the second voltage divider circuit to control an on and off state of the second switch to adjust the voltage at the current sensing terminal.

15. The power factor correction circuit according to claim 1, wherein the power factor correction control circuit further includes:
   a voltage error amplifier to output a voltage corresponding to a difference between a reference voltage and a feedback voltage,
   a first capacitor and a first RC phase compensation circuit, connected in parallel with one another, to smooth the voltage output by the voltage error amplifier, and
   a voltage error detection compensation terminal connected between each of the voltage error amplifier, first capacitor, and first RC phase compensation circuit.

16. The power factor correction circuit according to claim 15, wherein the power factor correction control circuit further includes:
   a current error amplifier to output a voltage corresponding to a difference between a current sensing voltage and a multiplication output voltage output from a multiplier,
   a second capacitor and a second RC phase compensation circuit, connected in parallel with one another, to smooth the voltage output by the current error amplifier, and
   a current error detection compensation terminal connected between each of the current error amplifier, second capacitor, and second RC phase compensation circuit.

17. The power factor correction circuit according to claim 16, wherein the power factor correction control circuit further includes:
   the multiplier, to which the voltage at the input voltage detection terminal is input and to which the voltage output by the voltage error amplifier is input, and from which the multiplication output voltage is output, the multiplication output voltage being obtained by multiplying the voltage at the input voltage detection terminal together with the voltage output by the voltage error amplifier.

* * * * *